United States Patent [19]
Osterday et al.

[11] Patent Number: 5,245,829
[45] Date of Patent: Sep. 21, 1993

[54] BRAKE BOOSTER WITH DUAL DUROMETER REAR BEARING

[75] Inventors: Craig A. Osterday; Douglas L. Osterfeld, both of Dayton, Ohio

[73] Assignee: General Motors Corporation, Detroit, Mich.

[21] Appl. No.: 939,748

[22] Filed: Sep. 2, 1992

[51] Int. Cl.$^5$ ............................................. B60T 13/00
[52] U.S. Cl. ................................. 60/547.1; 91/369.3; 91/576 R
[58] Field of Search ..................... 60/547.1; 91/369.1, 91/369.2, 369.3, 369.4, 376 R; 566/566

[56] References Cited
U.S. PATENT DOCUMENTS

| | | | |
|---|---|---|---|
| 4,587,885 | 5/1986 | Boehm et al. | 91/376 R |
| 4,953,446 | 9/1990 | Fecher et al. | 91/369.3 |
| 5,121,674 | 6/1992 | Uyama | 91/369.3 |

Primary Examiner—Edward K. Look
Assistant Examiner—Todd Mattingly
Attorney, Agent, or Firm—Ernest E. Helms

[57] ABSTRACT

A vacuum-actuated brake booster which can better utilize a wire elongated member type travel clip is brought forth. The brake booster provides a dual durometer rear bearing having a first soft portion for sealing and supporting the power piston and a second harder portion for cushioning the travel clip upon its engagement with the rear housing.

3 Claims, 3 Drawing Sheets

BRAKE BOOSTER WITH DUAL DUROMETER REAR BEARING

FIELD OF THE INVENTION

The field of the present invention is that of pneumatically actuated brake boosters with lost travel clips utilized for locating the retracted position of a power piston and an associated air valve with respect to a rear housing of the brake booster.

DISCLOSURE STATEMENT

Lost travel clips are utilized in an attempt to minimize the dead time associated with actuation of a vehicle pneumatic brake booster. The majority of vehicle brake boosters have a housing having front and rear sections with a slidably mounted power piston inserted therein. The power piston is usually fixably connected with at least one diaphragm which divides the housing into at least a vacuum chamber and a variable pressure chamber. An air valve is slidably mounted in an axial bore of the power piston. The air valve may be actuated by a push rod pivotally connected with a brake pedal. In cooperation with a floating control valve mounted within the power piston, the air valve selectively joins the variable pressure chamber with the vacuum chamber or with a pressure source such as ambient air to control the actuation of the brake booster.

In the released (or non-actuated) position, the air valve mates with the floating control valve. The variable pressure chamber is joined with the vacuum chamber via a fixed valve seat provided in the power piston. Movement of the air valve causes the floating control valve to mate with the power piston seat, preventing fluid communication between the pressure chamber and the vacuum chamber.

Further movement of the air valve causes the air valve to separate from the floating control valve, exposing the variable pressure chamber to the atmosphere. The amount of travel by the air valve before the variable pressure chamber is exposed to the atmosphere is referred to as dead time.

The power piston is spring biased to a retracted position by a return spring. In many power pistons, there is a clip which is insertable within a groove or hole of the power piston and mates with the rear housing to set the retracted position of the power piston. Additionally, this clip will often extend into the interior of the power piston to make contact with a flange on the air valve to also set the retracted position of the air valve, which is typically spring biased rearwardly. Since the floating control valve is already mounted within the power piston by setting the retracted position of the power piston and the air valve, the clip effectively sets the position of the floating control valve with respect to the fixed valve seat of the power piston. Therefore, an actuation clearance (travel) between the floating control valve and the power piston fixed valve seat can be minimized.

Some prior lost travel clips extended through the power piston and engaged the rear housing on top of the power piston and beneath the power piston. The clip extended generally somewhat offcenter from the vertical direction, generally along a path perpendicular to the line of travel of the master cylinder, which is typically inserted within a vehicle at an angle from the horizontal direction.

Prior lost travel clips typically were of two major configurations. One configuration was of an E-shaped clip. A central prong of the E-shaped clip projected into a hole or slot of the power piston. The central prong typically had a forked end to provide the retention function of the air valve by encircling a reduced diameter portion of the air valve. Disadvantages of the E-shaped clip were that it was typically a complex stamping and typically had to have a specific angular orientation in the power piston to retain it in place. Additionally, there was typically some type of holding mechanism which had to be utilized to retain the E-shaped clip in its proper position within the power piston.

A second improved version of the clip was to provide a clip having an elongated member which extends through the power piston contacting the housing on both sides. The advantage of this improved version of the clip was that it was simple to manufacture, often being able to be fabricated out of wire material. Additionally, the power piston had a slot of reduced complexity, and typically the holding mechanism utilized was superior.

With both versions of clip aforementioned, it is still desirable to reduce the noise associated with the clip hitting the rear housing when setting the rear position of the power piston in the associated air valve. One solution to the reduction of noise was to coat the clip with an elastomeric coating. Alternatively, the housing would be provided with an elastomeric coating material.

In a prior solution, a rear bearing which slidably mounts and seals the power piston had an extension joined thereto to provide a bumper to cushion the clip's contact with the housing. Typically, most rear bearings (sometimes referred to as seals or seal rings) have a durometer of 70 shore A plus or minus 5. It is important that the bearing material be sufficiently soft and compliant to ensure proper sealing. Providing a booster having a rear bearing with a bumper portion joined thereto worked best with the first version of travel clips. The reason that this type of bearing worked best with the first version of travel clip was that the first version of travel clip, due to the circular arms which were joined to the central prong of the clip, provided a greater contact area between itself and the rear housing. Assuming a constant power piston spring force, the greater contact area would lower the pressure force upon the rubber. This lowering of the pressure force provided low compression, thereby reducing any chance for additional travel loss due to the compressibility of the elastomeric material, and additionally, since pressure forces were not high, provided low wear characteristics for the elastomeric material.

However, utilizing travel clips of the second version, the prior solution of utilizing the rear bearing with a portion for cushioning the clip was not found to be as preferable due to the fact that the second version typically was fabricated from wires, therefore having less of a contact area. As a consequence, there was a greater pressure force exerted upon the elastomeric material, giving potential for greater compression and greater wear.

With either version of the clip, it is desirable that the portion of the rear bearing which cushions the clip be as thin as possible to reduce variances in dimensional stack-up tolerances. Therefore, even if utilizing the first version, it is still preferable to have this portion of the rear bearing be as thin as practically possible.

SUMMARY OF THE INVENTION

To provide a vacuum-actuated brake booster which can better utilize a wire elongated member type travel clip is brought forth. The present invention provides a dual durometer rear bearing having a first soft portion for sealing and supporting the power piston and a second harder portion for cushioning the travel clip upon its engagement with the rear housing.

DETAILED DESCRIPTION OF THE INVENTION

Figure 1:
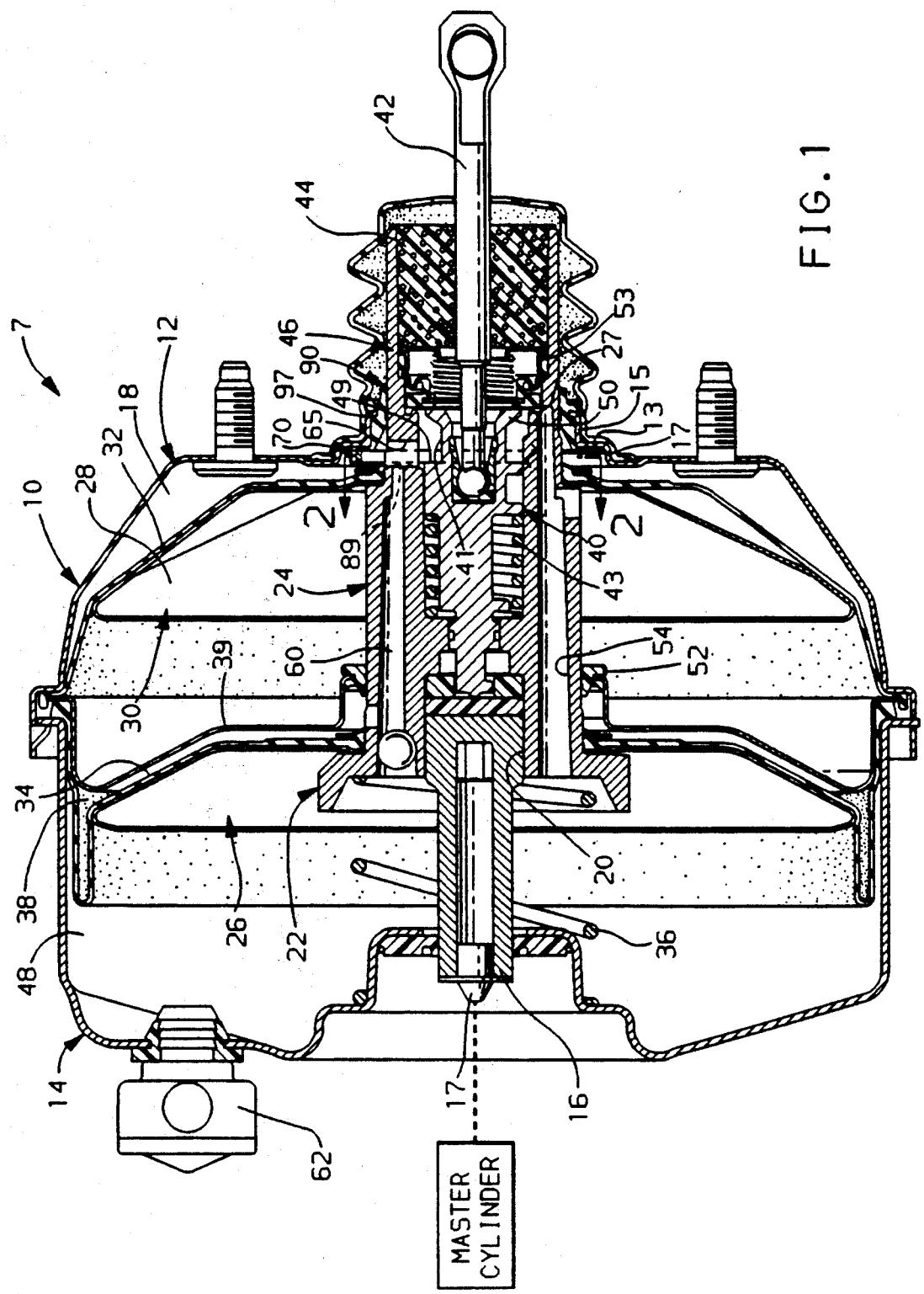
FIG. 1 is a sectional view of a preferred embodiment vacuum booster according to the present invention.
Figure 2:
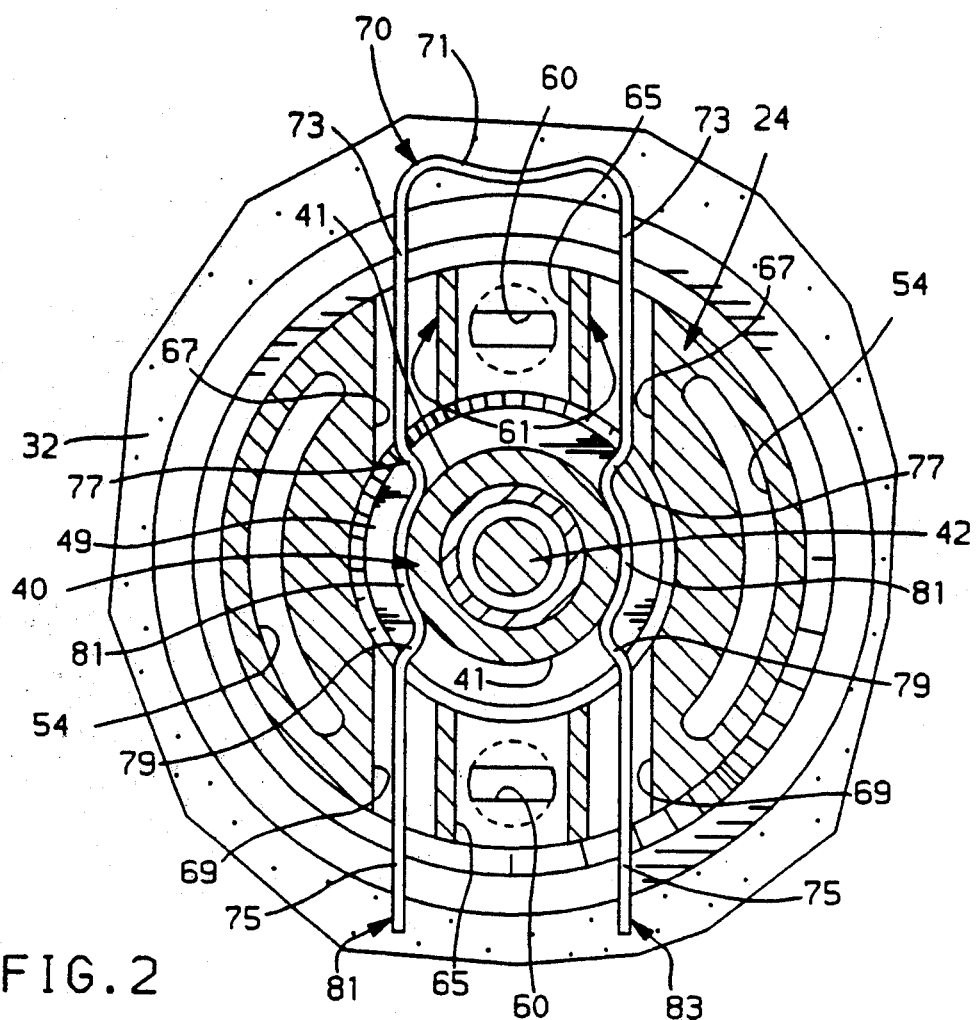
FIG. 2 is a view taken along line 2—2 of FIG. 1.
Figure 3:
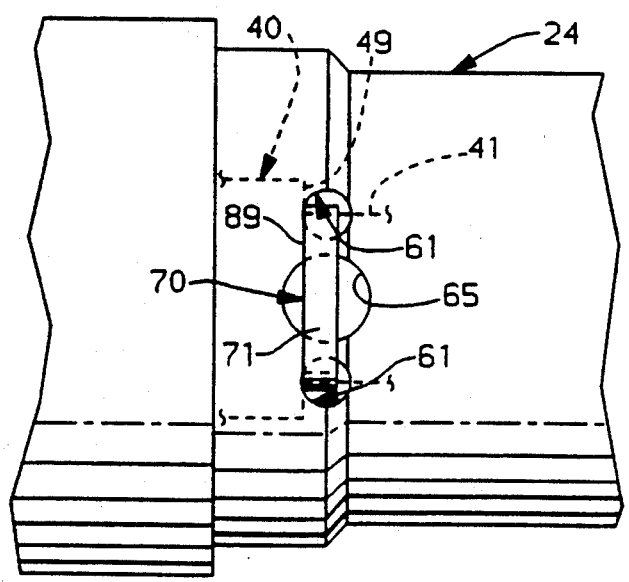
FIG. 3 is a partial plan view of the clip, air valve and power piston as shown in FIG. 2, with other portions of the booster removed.

Referring to FIGS. 1, 2 and 3, a vehicle dual diaphragm tandem vacuum booster assembly 7 includes a booster housing 10 having a rigid front and rear housing section 14, 12. The booster 7 has an output rod 16 inserted within a bore 20 of the power piston assembly 22. The piston assembly 22 includes a piston 24, a front or secondary diaphragm support plate 26 and a rear or primary diaphragm support plate 30. Sealably connected with the piston 24 are rear primary and front secondary diaphragms 32, 34. The piston 24 is illustrated in the release position. The piston 24 is normally urged to a release position by a power piston return spring 36. An air control valve assembly 40 is received within the rear portion of the piston 24 and is actuated by suitable well known means such as a push rod 42, which is in turn connected with a brake pedal (not shown). Since the booster 7 is a vacuum-suspended booster, the control valve assembly 46 is so positioned that in the released position, first, second, third and fourth booster assembly power chamber control volumes 18, 28, 38, 48 are at vacuum pressure. The control volumes 28 and 38 are separated by a pressure boundary formed by a rigid divider 39 which is fixed with respect to the front and rear housings 12, 14. However, the divider 39 is slidably sealably associated with the piston 24 via a forward bearing, 52. Control volumes 18 and 38 are variable pressure chambers joined by passage 60 of the piston 24. Control volumes 28 and 48 are usually held at a vacuum and are connected by one of the passages 54 (shown 90 degrees off center for clarity of illustration in FIG. 1) of the piston 24. A check valve 62 exposes control volumes 28 and 48 to the engine manifold when vacuum is available.

To actuate the booster 7, the push rod 42 pushes against an air valve spring 43 to remove a tip 50 of the air valve assembly 40 from the floating control valve 46 (which is fitted within the piston 24 by a retainer 53). The above allows atmospheric air to pass through a filter 44, past the tip 50, through the piston radial passage 65 and into control volumes 18 and 38 (via passage 60). The entrance of atmospheric air causes a pressure force to act against the supports 30 and 26, causing the piston 24 to move leftward as shown, causing a rod 16 and metallic button 17 to actuate a master cylinder (not shown). As mentioned previously, the piston 24 is biased in a rearward position by a spring 36. The air valve 40 is biased rearwardly by an air valve spring 43. The air valve has a face or tip 50 which, in the retracted position, contacts with the control valve assembly 46 to create a slight gap between the control valve assembly 46 and a seat 27. The gap between the seat 27 and the control valve 46 allows the pressure chambers 38 and 18 to communicate via passage 54 with the vacuum chamber 48. Minimizing the gap between the valve seat 27 and the floating control valve 46 in the rest position minimizes the dead travel time of the booster 7. Maximizing the gap between the control valve assembly 46 and the valve seat 27 while the piston is traveling in a retracted direction (after actuation) ensures adequate speed of response in relieving the brake once a vehicle operator has removed his or her foot from the brake pedal. Upon actuation of the vehicle brake, the air valve will be moved leftward 10 until the floating control valve 46 seats on the valve seat 27, thereby shutting off fluid communication between the variable control chambers and the vacuum control chamber 28. Thereafter, actuation of the brake will occur as previously described.

To accurately set the position of the air valve 40 and the piston 24 in the retracted rest position, there is provided a clip 70. The clip 70 has two legs 81, 83 which are joined together by a head section 71. The clip 70 is inserted within two generally parallel holes 61 of the piston 24. Each leg of the clip has an upper or first straight section 73 for insertion into an upper portion 67 of the holes. None of the clip legs 81, 83 will make contact with the piston 24 when the piston is in the retracted position except a leading edge 89.

The clip 70 also has a spring section comprised of a first inner descending bend 77, an air valve engaging section 81 and a lower outer descending bend 79. The spring section of the clip compliantly engages the clip 70 with a small diameter 41 portion of the air valve. A lower second straight section 75 of the clip projects through a lower portion 69 of the hole 61.

In the retracted position, the clip by virtue of contact with a flange 49 of the air valve sets the position of the air valve 40 with respect to the rear housing 10. The rear housing 10 has a first cylindrical draw 15 joined to an annular section 13, which is in turn joined with a second cylindrical draw 17. It is desirable from a cost standpoint to keep the second cylindrical draw 17 at as short a distance as possible. Therefore, it is desirable that the clip 70 be retained vertically as the power piston is actuated so that it does not fall down when the booster 7 is actuated. Vertical retention is also desired so that the portion of the upper straight section 73 which engages with the housing annular portion 13 is essentially equal to the portion of the lower straight leg section 75 that engages with the annular portion 13. However, the clip spring section allows the holes 61 to have any nonvertical orientation since the spring section prevents the clip translating in the holes 61.

Although shown as a metal, the piston 24 can also be a thermoplastic or thermoset material. The clip 70 may be assembled to the piston 24 by inserting the air valve 40, pushing on the push rod to align the small diameter section 41 of the air valve with the generally parallel hole 61 and then simply pushing in the clip 70. The clip 70 will automatically snap into position upon its insertion, thereby giving assurance to the assembler that assembly has occurred in a proper manner. Since the clip 70 will naturally spring about the air valve small diameter, the inner descending bend 77 and the outer descending bend 79 place the clip legs 81, 83 closer to each other than the diameter of the small diameter portion 41 of the air valve. The clip 70 will have a snapping action, assuring the assembler of proper insertion and thereafter retaining the clip 70 in its proper positional orientation in the hole 61. The deformation of the clip 70 will be entirely elastic, and therefore the piston and air valve will not be subject to any forces which could possibly inadvertently damage such components.

Removal of the clip can be accomplished without any tools by simply pulling up on the head section 71 to remove the clip from the air valve 40 and out of the generally parallel holes 61. Additionally, since deformation of the clip is elastic, hole 61 may be straight bores and need not be contoured to induce a permanent deformation upon the clip 70.

The clip 70 is typically fabricated from wire with a rectangular cross section with radius edges.

The front end of the power piston 24 is supported by a bearing 52 which is associated with a divider plate 39. Alternatively, in boosters wherein there is no divider plate such as in single vacuum chamber boosters, the booster front end will be supported by virtue of the output rod 16 which is held in position by a master cylinder (not shown), which is fixably connected with the front housing 14.

Figure 4:
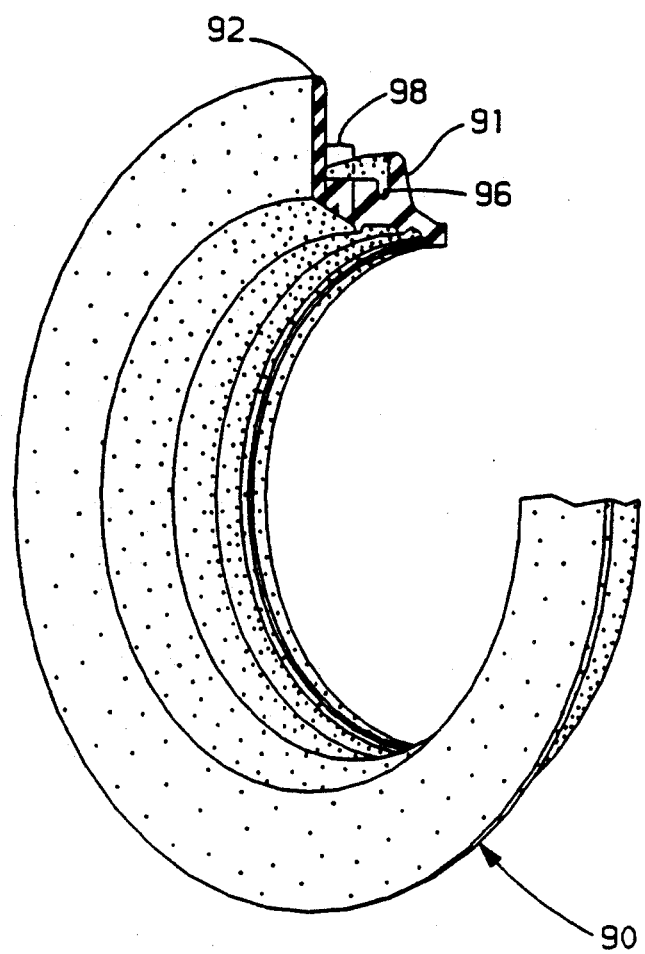
FIG. 4 is a perspective view, partially sectioned, of a rear seal according to the present invention before installation.
Figure 5:
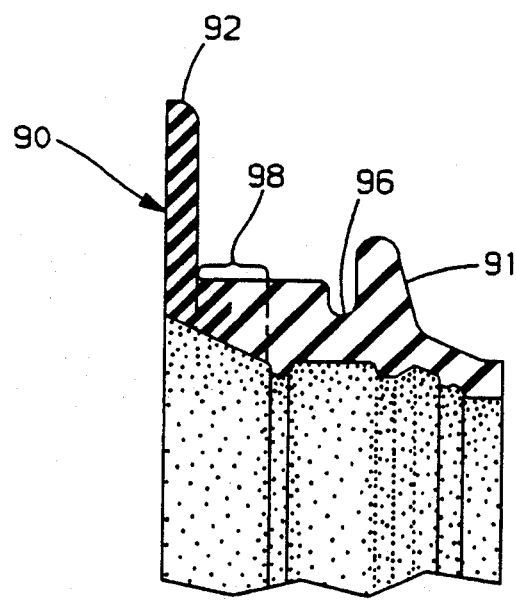
FIG. 5 is a partial sectional view of the rear seal shown in FIG. 4.

Slidably supporting and sealing the power piston 24 at its rearward end is a rear bearing or seal ring 90. Referring additionally to FIG. 4, the rear bearing 90 has a groove 96 to allow for insertion of a generally radially inward directed flange 97 of the rear housing. The rear bearing has a first portion 91 which, as mentioned previously, supports that power piston and has a forward second portion 92 which abuts the annular portion 13 of the housing. The first portion has a shore A durometer of 70 plus or minus 5. The second portion of the bearing has a shore A durometer of 80 plus or minus 5 or optionally 85 plus or minus 5.

Between the second portion 92 and the first portion 91 there is a transition area 98 which is usually a portion of the bearing which has a durometer in between the above-mentioned values due to the molding process.

In operation, the second portion 92 of the bearing is juxtaposed between the annular portion 13 of the rear housing and the clip 70. Compression set of the bearing 90 is typically less than 14 percent.

While an embodiment of the present invention has been explained, it will be readily apparent to those skilled in the art of the various modifications which may be made to the present invention without departing from the spirit and scope of this application as it is encompassed by the following claims.

The embodiments of the invention in which an exclusive property or privilege is claimed are defined as follows:

1. A vehicle pneumatic actuated brake booster for powering a hydraulic master cylinder of a vehicle braking system comprising:
   a sealed housing having a rearward end connected with the vehicle and a forward end adjacent the master cylinder, the rearward end of the housing having an aperture with a radially outward extending annular portion;
   a spring biased power piston assembly slidably mounted within the housing and having an operatively associated push rod for imparting force to the master cylinder, the power piston being connected with a flexible diaphragm dividing the housing into separate pressure chambers;
   air valve means slidably mounted within the power piston assembly operatively associated with a push rod to selectively join one of the pressure chambers with the other pressure chambers and with an outside pressure source;
   clip means located within the power piston generally transversely setting the rearward, non-actuated position of the power piston assembly and air valve by contact with the rear housing annular portion;
   means for slidably supporting the power piston assembly along a forward end of the power piston assembly; and
   a rearward seal ring, the rearward seal ring supporting a rearward end of the power piston assembly, the seal having a first portion for slidably sealably supporting the power piston and joined forward therefrom a second portion juxtaposed between the clip means and the rear housing annular portion for cushioning the clip means, the first portion being a first lower durometer, the second portion being of a second higher durometer.

2. A booster as described in claim 1 wherein the rearward seal first portion has a durometer reading of Shore A 70 plus or minus 5 and a second portion has a Shore reading of 80 plus or minus 5.

3. A booster as described in claim 1 wherein the rearward seal has a first portion with a durometer reading of Shore A 70 plus or minus 5 and a second portion has a durometer reading of Shore A of 85 plus or minus 5.

* * * * *